United States Patent
Kuroda

(10) Patent No.: US 7,999,886 B2
(45) Date of Patent: Aug. 16, 2011

(54) BACKLIGHT APPARATUS AND LIQUID CRYSTAL APPARATUS HAVING PARTICULAR LIGHT EMISSION CONTROL

(75) Inventor: Kazuo Kuroda, Saitama (JP)

(73) Assignee: Pioneer Corporation, Tokyo (JP)

( * ) Notice: Subject to any disclaimer, the term of this patent is extended or adjusted under 35 U.S.C. 154(b) by 869 days.

(21) Appl. No.: 11/989,695

(22) PCT Filed: Aug. 10, 2006

(86) PCT No.: PCT/JP2006/315813
§ 371 (c)(1),
(2), (4) Date: Jan. 30, 2008

(87) PCT Pub. No.: WO2007/018262
PCT Pub. Date: Feb. 15, 2007

(65) Prior Publication Data
US 2009/0153773 A1    Jun. 18, 2009

(30) Foreign Application Priority Data
Aug. 11, 2005    (JP) ................. 2005-233439

(51) Int. Cl.
*G02F 1/1335*    (2006.01)
*G02F 1/1333*    (2006.01)
*G09G 3/36*    (2006.01)
*G09F 13/04*    (2006.01)

(52) U.S. Cl. ............. 349/62; 349/61; 349/58; 345/102; 362/97.1

(58) Field of Classification Search .............. 349/62, 349/61, 58; 345/102; 362/97.1
See application file for complete search history.

(56) References Cited

U.S. PATENT DOCUMENTS

| | | | |
|---|---|---|---|
| 6,415,531 B1 * | 7/2002 | Ohtsuki et al. ........... | 36/31 |
| 7,157,850 B2 * | 1/2007 | Miyazaki et al. ......... | 313/495 |
| 7,272,275 B2 * | 9/2007 | Spoonhower et al. ...... | 385/15 |

FOREIGN PATENT DOCUMENTS

| | | |
|---|---|---|
| JP | 2000-321993 | 11/2000 |
| JP | 2001-92370 | 4/2001 |
| JP | 2001-184034 | 7/2001 |
| JP | 2001-331156 | 11/2001 |
| JP | 2004-206044 | 7/2004 |
| JP | 2005-99367 | 4/2005 |
| JP | 2005099367 A * | 4/2005 |

OTHER PUBLICATIONS

International Search Report mailed Nov. 7, 2006.

* cited by examiner

*Primary Examiner* — Mike Qi
(74) *Attorney, Agent, or Firm* — Nixon & Vanderhye P.C.

(57) ABSTRACT

By controlling light emission, non-emission, and light intensity of each of the light emitting elements arranged on a backlight unit, a point-shaped light emitting point is created and the light emitting point is moved along the arrangement of pixels formed on a liquid crystal display panel unit. By moving the light emitting point as if an electron beam were scanning in the CRT display, it is possible to enhance the dynamic image blur removal effect.

15 Claims, 14 Drawing Sheets

[FIG. 1]
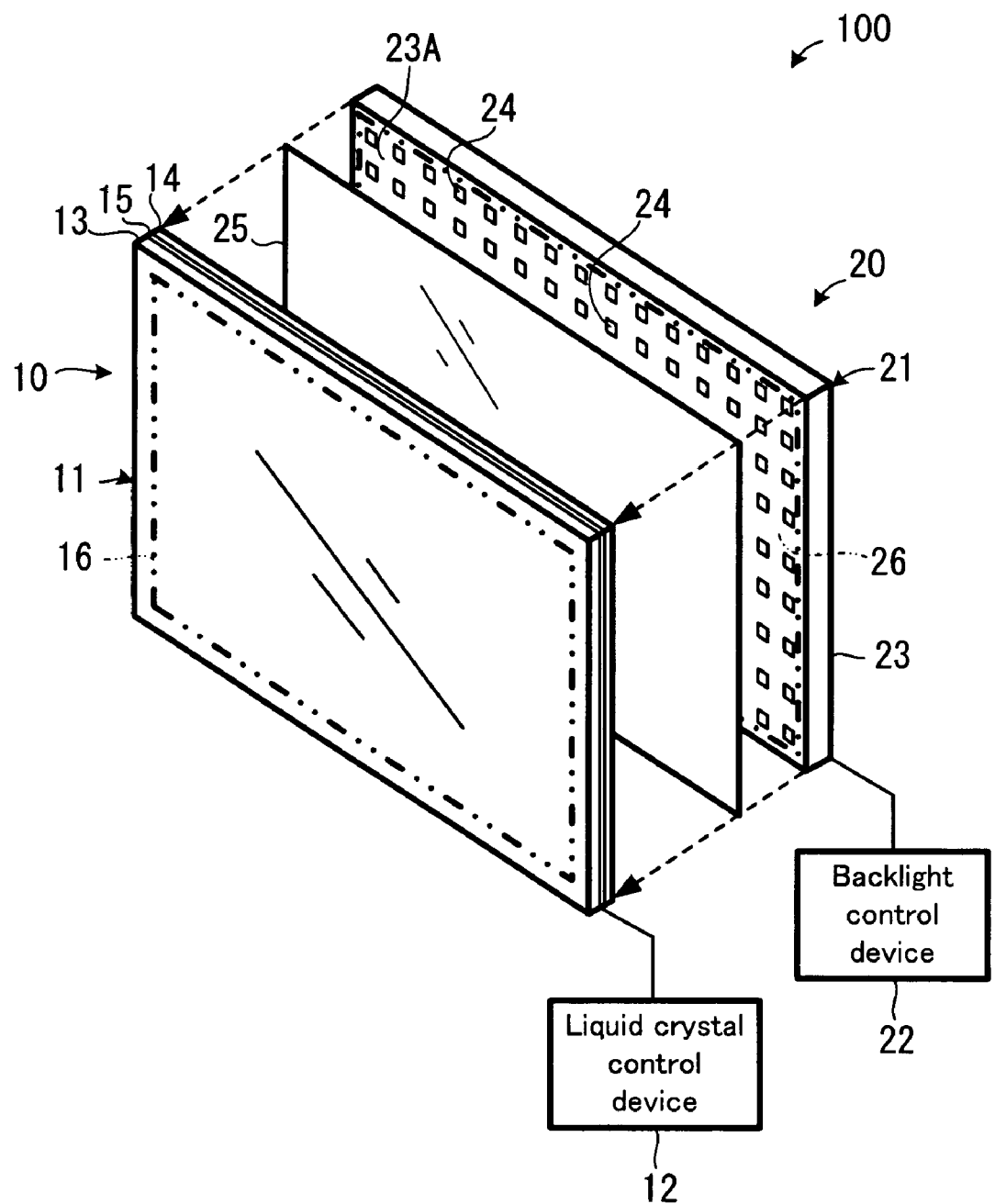

[FIG. 2]
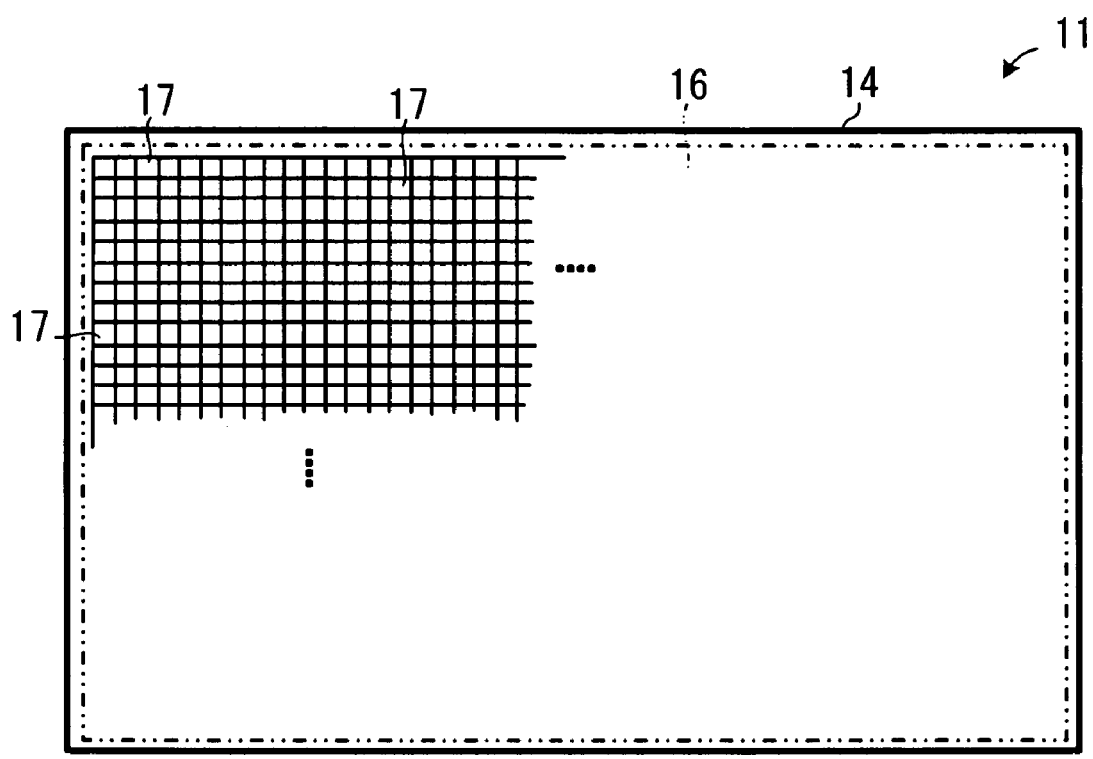

[FIG. 3]
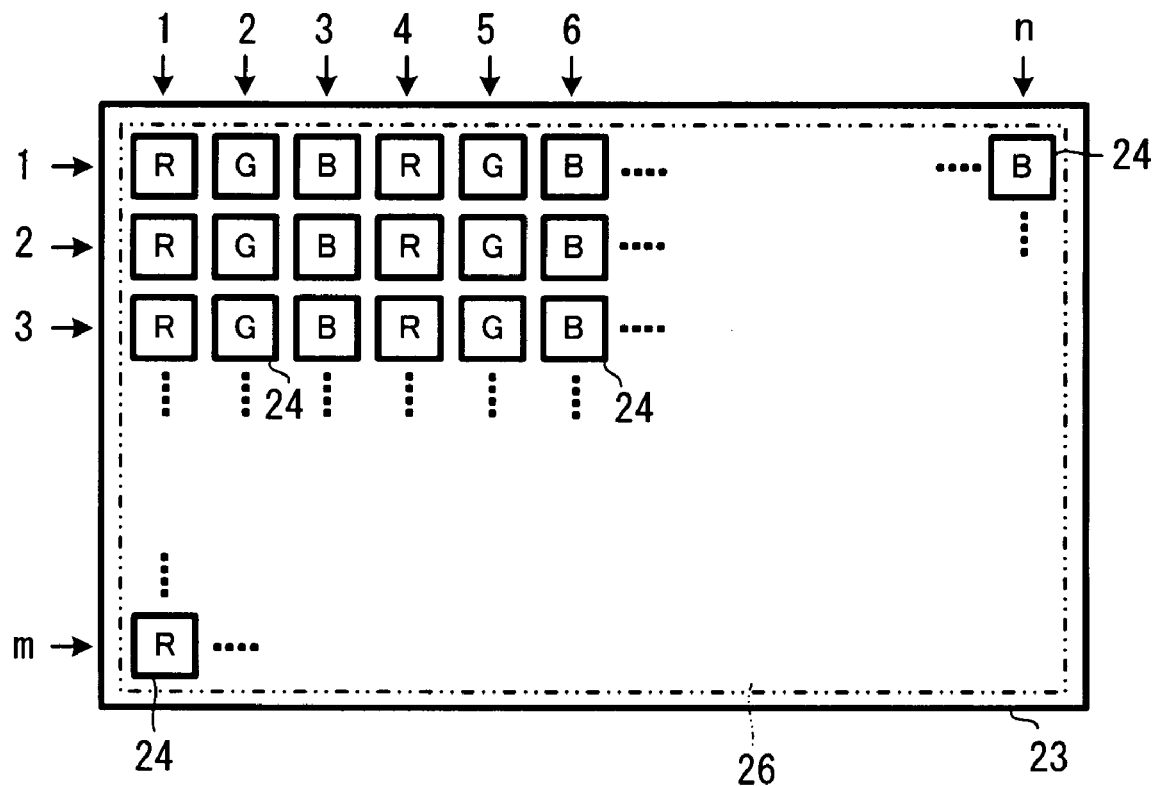
[FIG. 4]
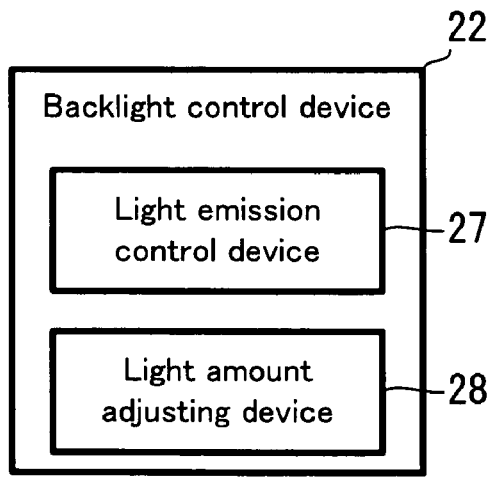

[FIG. 5]
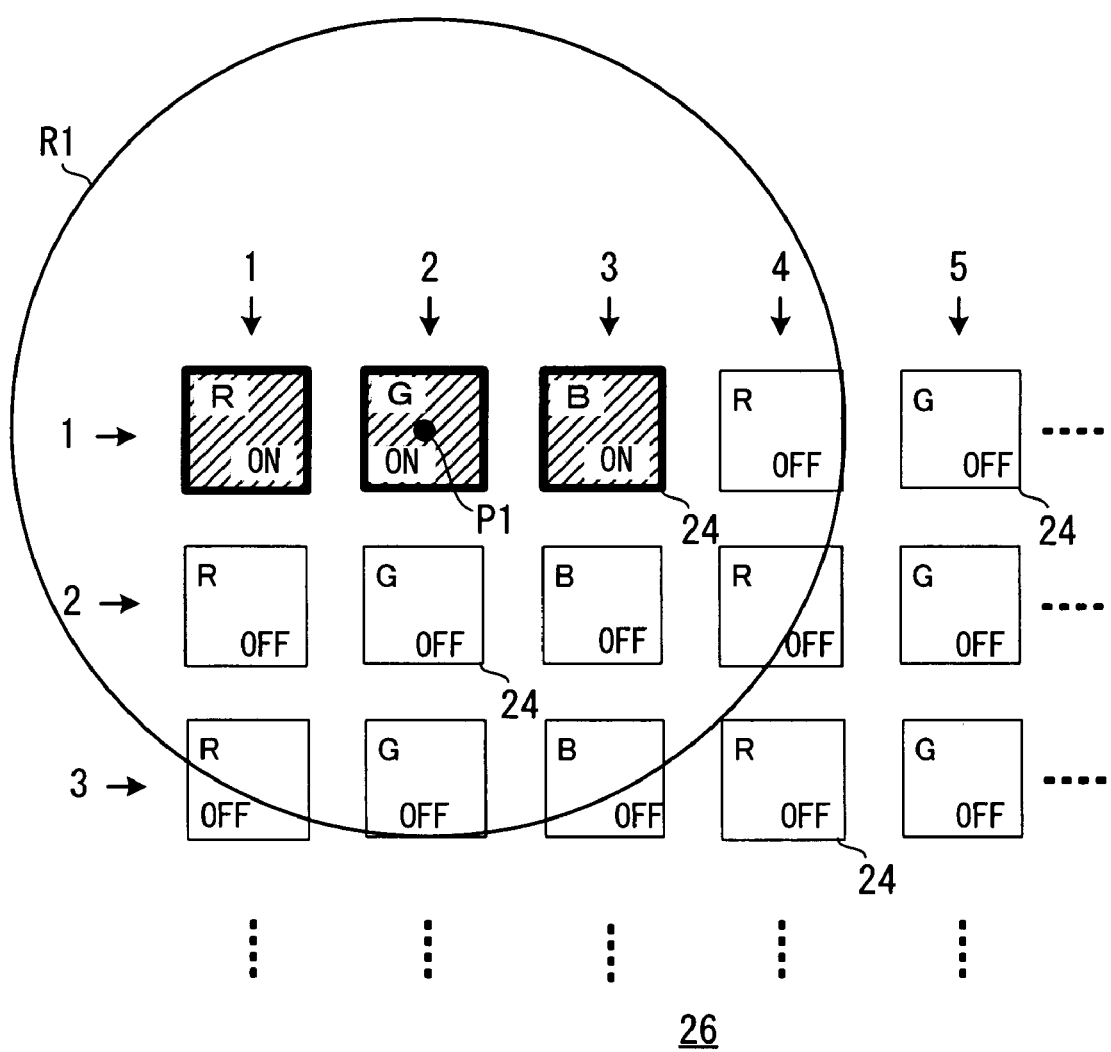

[FIG. 6]
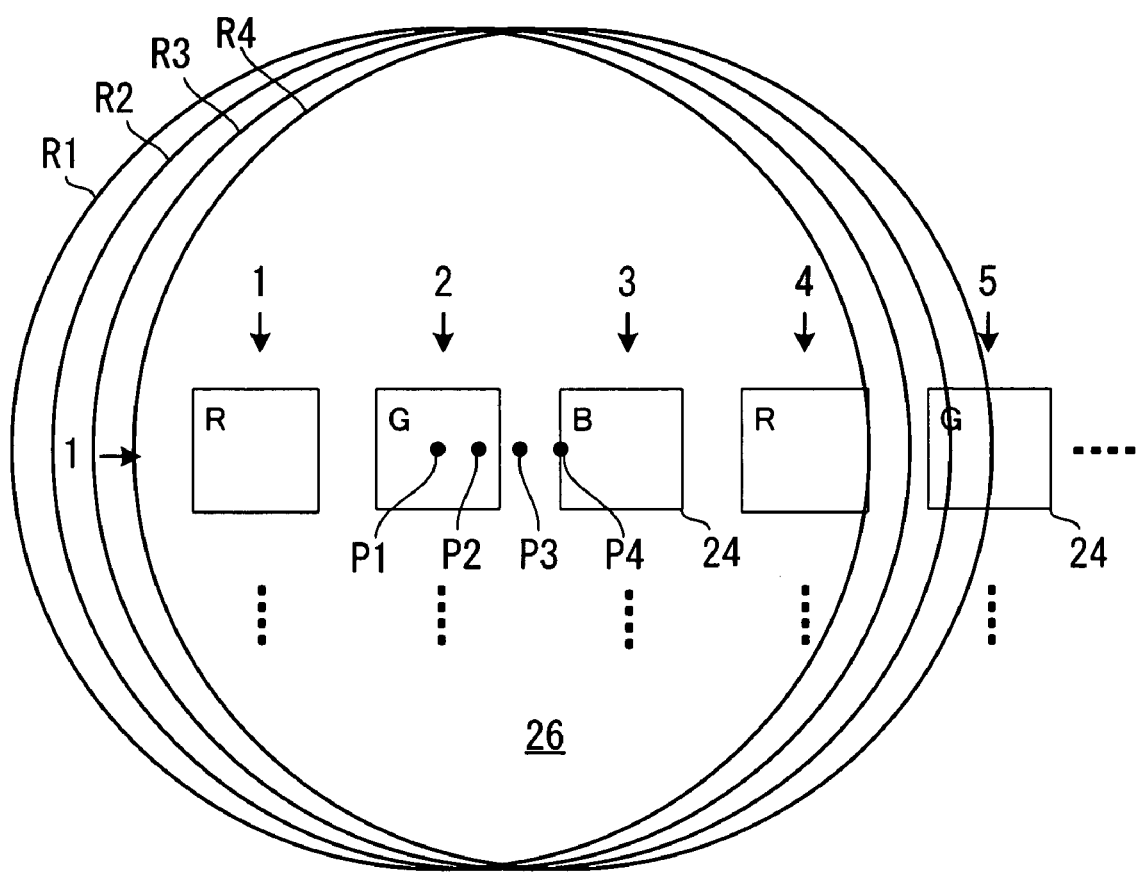

[FIG. 7]
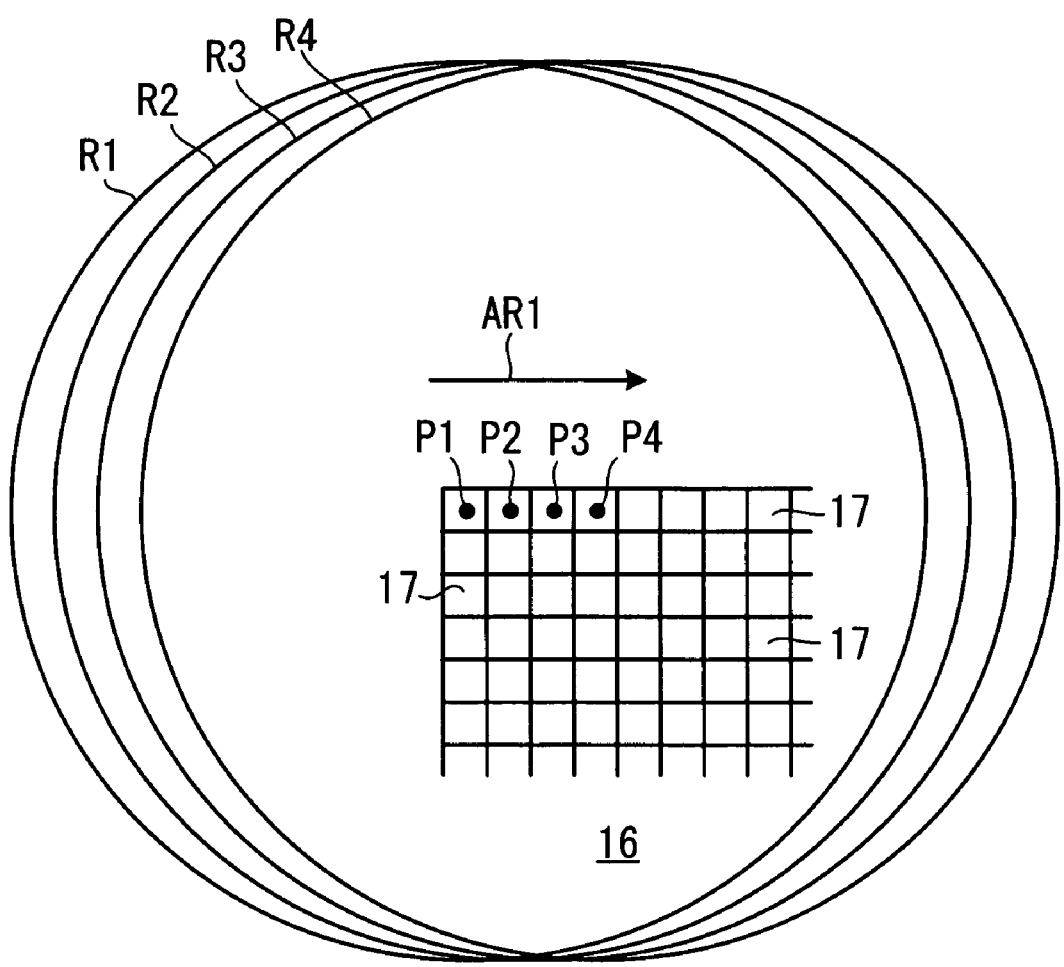

[FIG. 8]
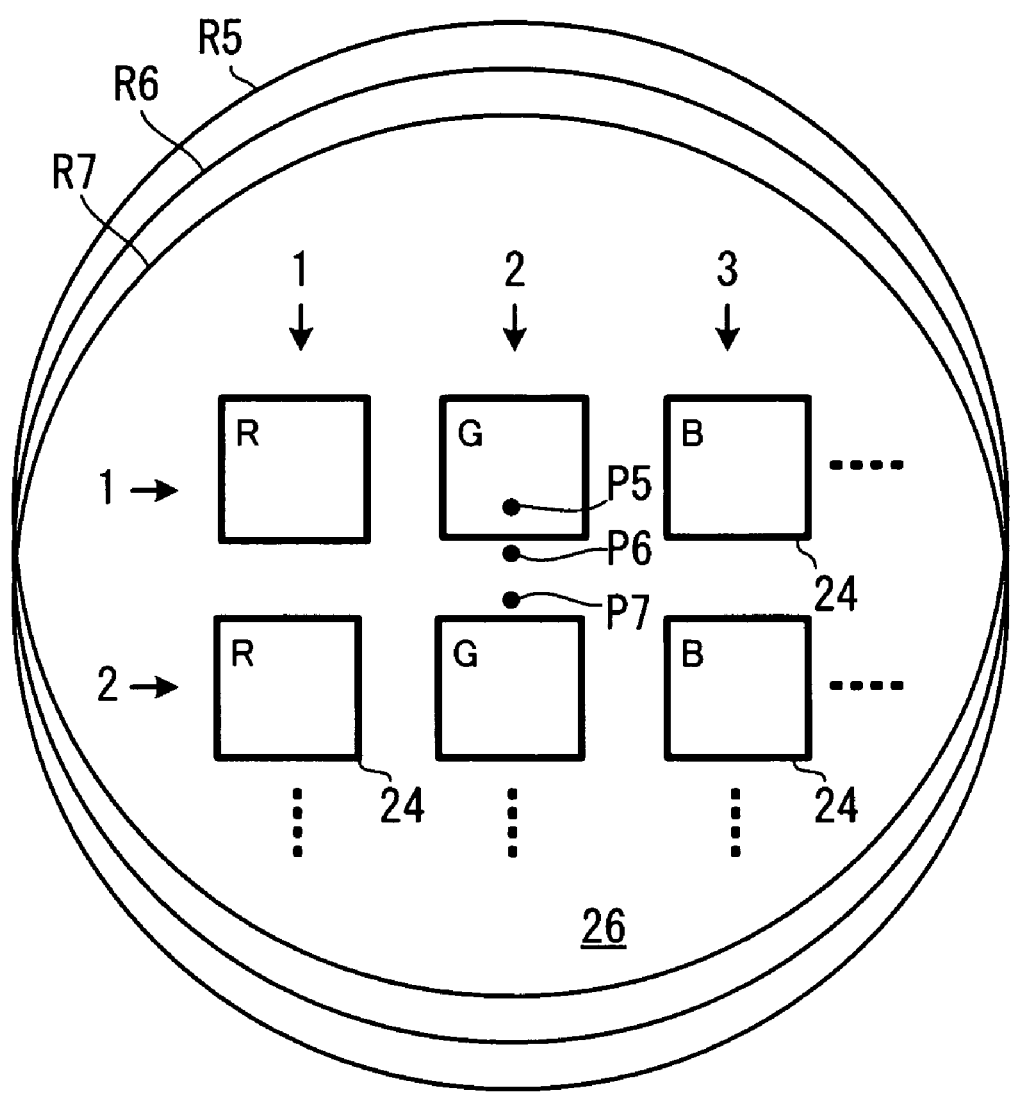

[FIG. 9]
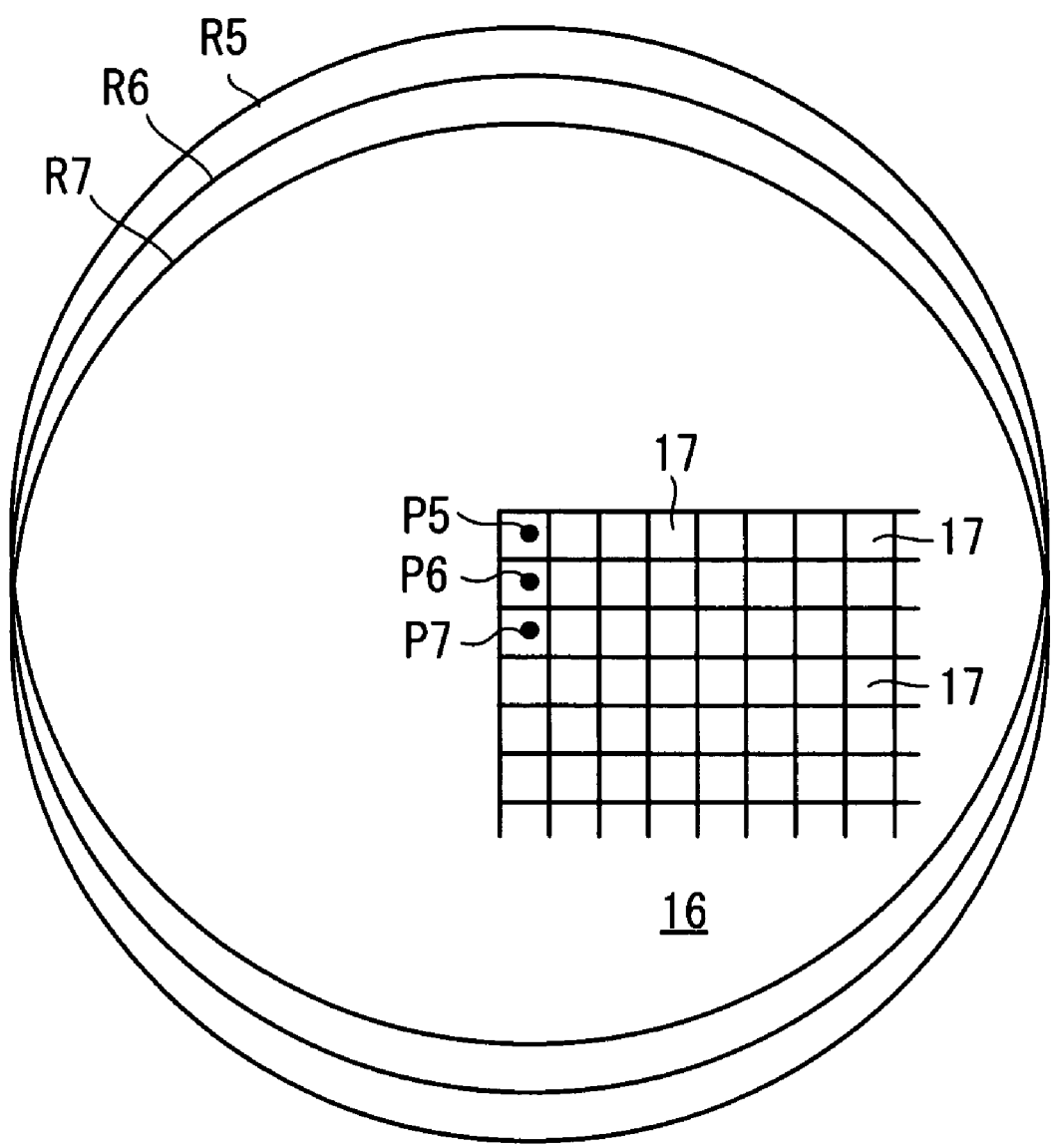

[FIG. 10]
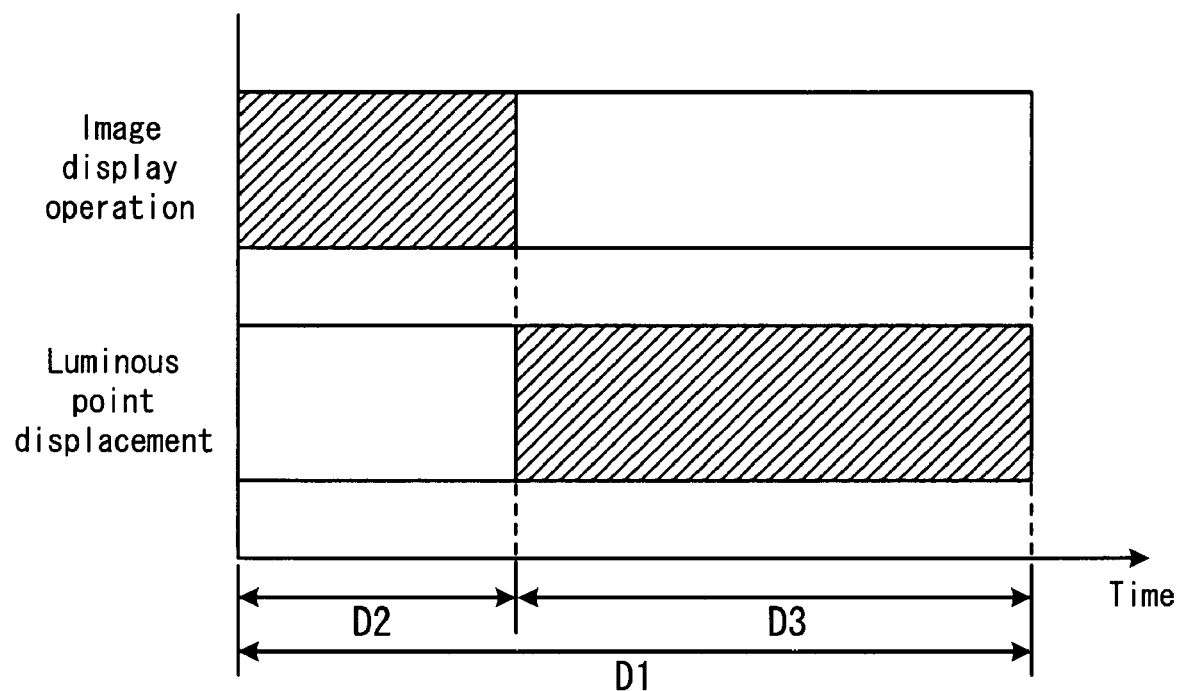

[FIG. 11]
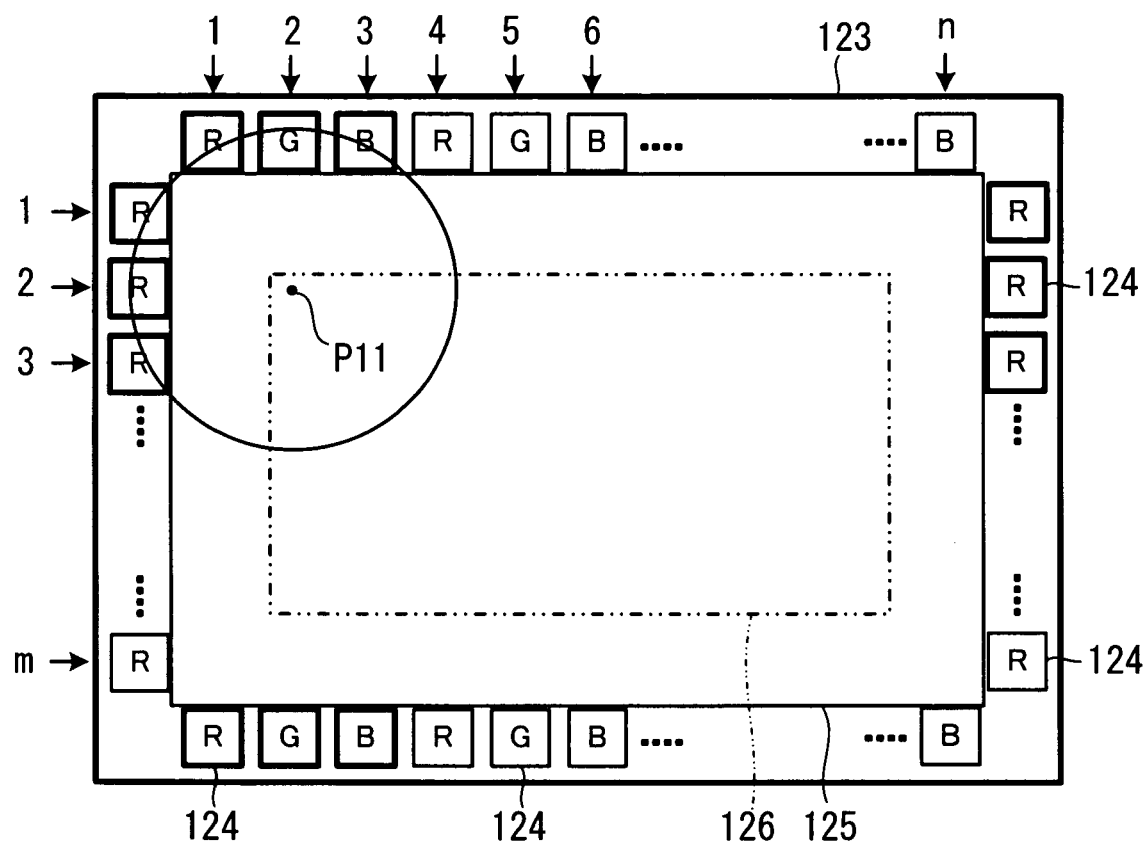

[FIG. 12]
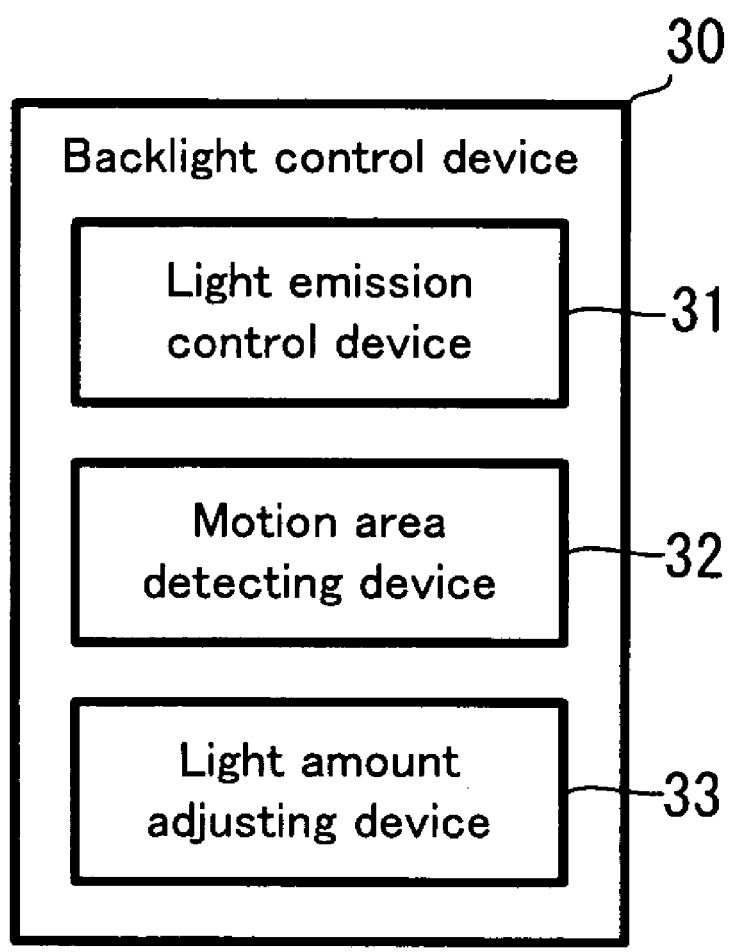

[FIG. 13]
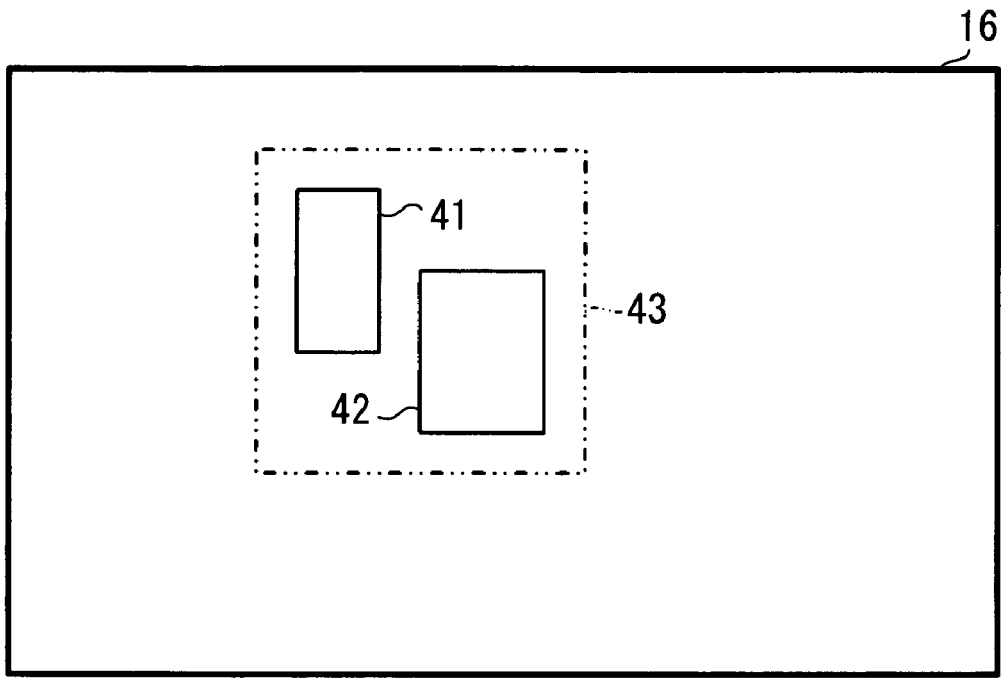
[FIG. 14]
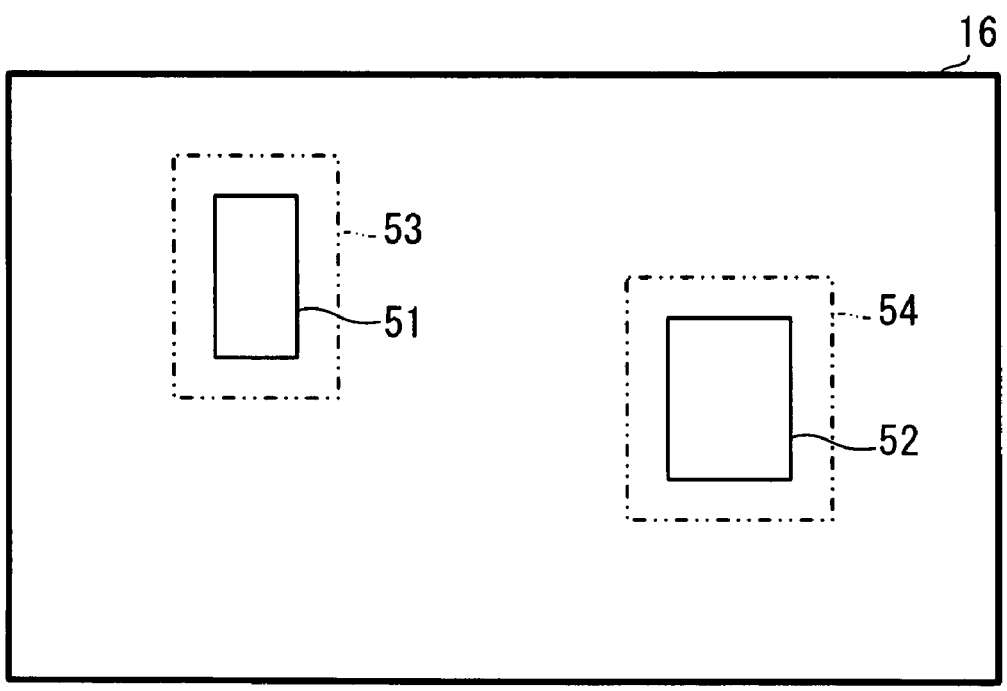

[FIG. 15]
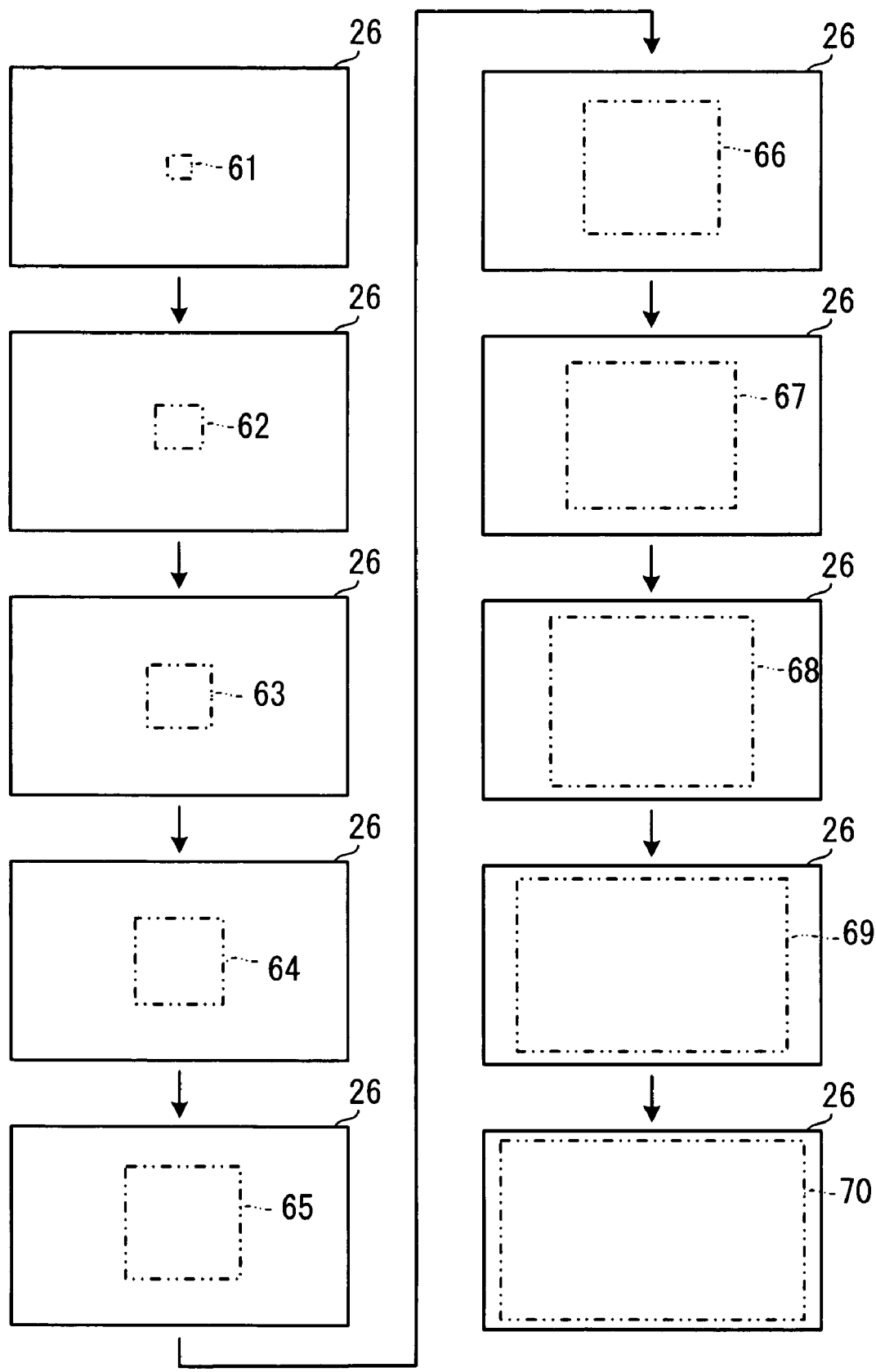

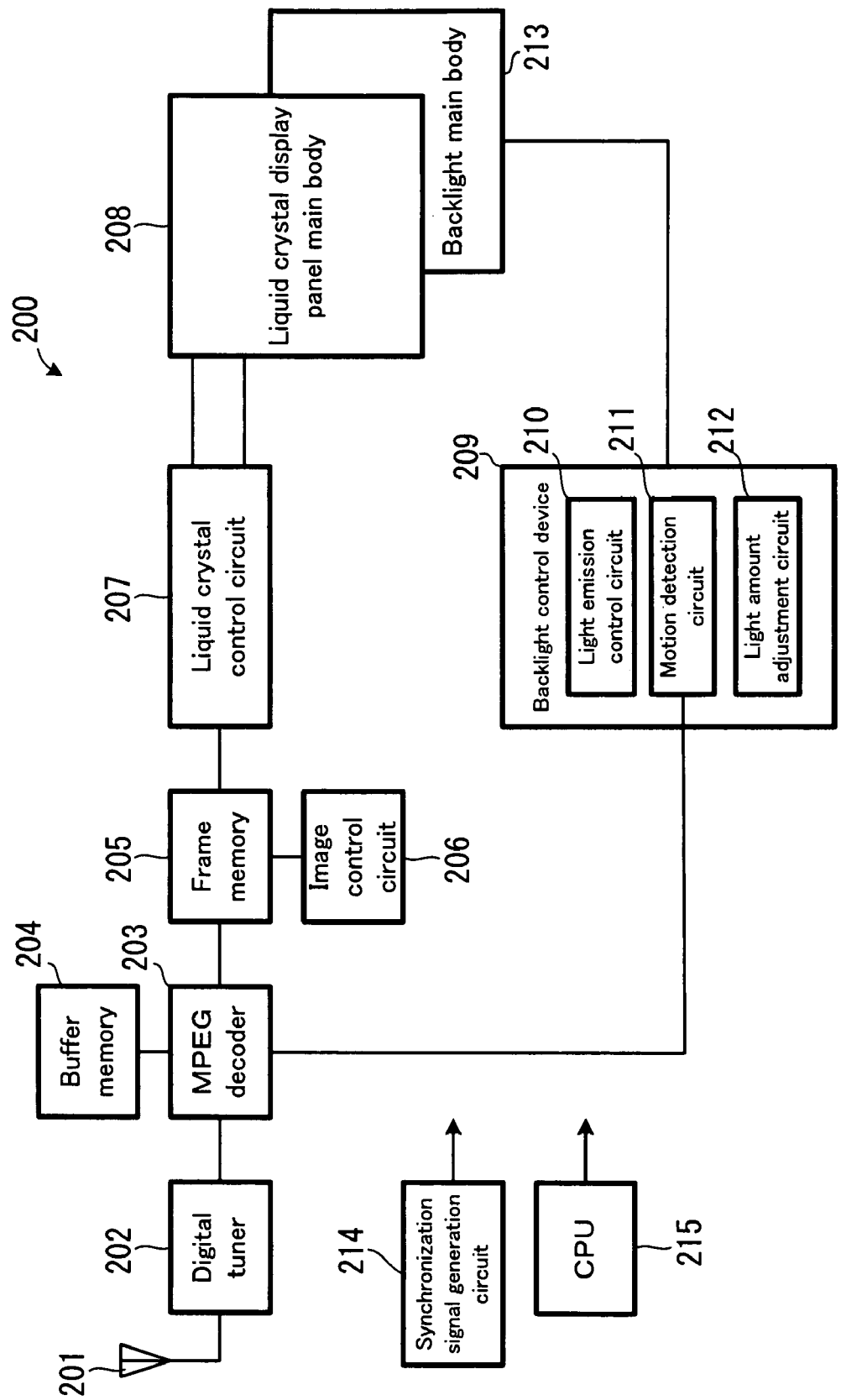
[FIG. 16]

BACKLIGHT APPARATUS AND LIQUID CRYSTAL APPARATUS HAVING PARTICULAR LIGHT EMISSION CONTROL

This application is the U.S. national phase of International Application No. PCT/JP2006/315813, filed 10 Aug. 2006, which designated the U.S. and claims priority to JP 2005-233439, filed 11 Aug. 2005, the entire contents of each of which are hereby incorporated by reference.

1. Technical Field

The present invention relates to a backlight apparatus suitable to be used for a liquid crystal display apparatus or the like, and a liquid crystal display apparatus.

2. Background Art

Lately, the spread of a so-called flat display apparatus, such as a liquid crystal display apparatus, a plasma display apparatus, and an organic EL (Electroluminescence) display apparatus, has been growing. In the market of a television, a monitor for a personal computer, or the like, the flat display apparatus is getting more general than a CRT (Cathode Ray Tube) display apparatus.

By the way, it is known that a difference in the display method between the liquid crystal display apparatus and the CRT display apparatus is one reason to cause a blur (persistence of vision) in a motion picture on the liquid crystal display apparatus.

That is, the CRT display apparatus displaces an electron beam at high speed in a CRT for scanning, to thereby form an image in a display screen. That is, the CRT display apparatus allows a point of light formed by the electron beam to be displaced at high speed in the display screen. Thus, if attention is focused only on an extremely small area in the display screen, for example, it is only a brief moment (e.g. a short period of μsec order) that the light is emitted from the small area to the eyes of a human in a period of one field.

As described above, jn the CRT display apparatus, it is extremely short that the light is actually emitted in the same place in the display screen. In other words, it is long that the light is out in the same place in the display screen. Thus, as in the case that the motion picture is displayed, even if the image displayed on the display screen is changed one after another, the human does not sense the blur in the image. The image changed one after another is recognized to be sufficiently continuous for the human because of a residual effect.

On the other hand, the liquid crystal display apparatus sets the orientation of liquid crystal molecules in accordance with the image to be displayed, to thereby set a ratio at which the light emitted from a backlight apparatus is transmitted through the liquid crystal. That is, in the liquid crystal display apparatus, the light outputted from the backlight apparatus and transmitted through the liquid crystal is continuously emitted from the entire display screen to the eyes of the human between when the orientation of liquid crystal molecules is set in accordance with the image to be displayed and when the orientation of liquid crystal molecules is reset in accordance with the next image to be displayed (e.g. in a period of one field). Thus, the human continues to watch the image colored without spaces, for example, in the period of one field.

As described above, in the liquid crystal display apparatus, the constant intensity of light is emitted continuously for a long time in the same place in the display screen. Thus, when the motion picture is displayed, if the image displayed on the display screen is changed one after another, the human senses the blur in the image. It is because the human sees the next image before the residual image of the first image.

There are known some technologies aimed at improving the blur in the motion picture on the liquid crystal display apparatus. Japanese Patent Application Laid Open No. 2000-321993 (patent document 1) and Japanese Patent Application Laid Open No. 2001-92370 (patent document 2) disclose such a technology that a backlight apparatus is provided with a plurality of light emitting members, e.g. fluorescent tubes, each having a linear light emission area, and that the light emitting members are sequentially illuminated or lighted. That is, the linear light emission area is displaced vertically in the display screen in the period of one field, to thereby reduce a time length in which the light is emitted from the backlight apparatus to the eyes of the human.

Moreover, another technology is also known; namely, a technology in which image data, which is all black, is inserted into video data to be displayed on the display screen, to thereby reduce a time length in which the image is actually seen in the eyes of the human in the period of one field.

Patent document 1: Japanese Patent Application Laid Open No. 2000-321993

Patent document 2: Japanese Patent Application Laid Open No. 2001-92370

DISCLOSURE OF INVENTION

Subject to be Solved by the Invention

In the aforementioned technologies, however, there is such a technical problem that it is hard to increase an effect of eliminating the blur in the motion picture as equally as the CRT display does.

That is, the CRT display apparatus displaces the point of light formed by the electron beam. Thus, it is one moment that the light is emitted in the same place in the display screen. In other words, it is long that the light is out in the same place in the display screen. As a result, according to the CRT display apparatus, it is possible to achieve the sufficient effect of eliminating the blur in the motion picture.

In contrast, in the technology disclosed in the aforementioned Japanese Patent Application Laid Open No. 2000-321993 or Japanese Patent Application Laid Open No. 2001-92370, the thick linear light emission area with a certain degree of width is displaced vertically in the display screen. Thus, it is longer that the light is emitted in the same place in the display screen, as compared to the case that the point of light is displaced. In other words, it is shorter that the light is out in the same place in the display screen, as compared to the case that the point of light is displaced. As a result, in the technology disclosed in the aforementioned Japanese Patent Application Laid Open No. 2000-321993 or Japanese Patent Application Laid Open No. 2001-92370, it is hard to increase the effect of eliminating the blur in the motion picture as equally as the CRT display does.

Moreover, according to the technology in which the black image data is inserted into the video data, it seems like it is possible to increase the effect of eliminating the blur in the motion picture by significantly increasing the display period of the black image data and significantly reducing, by that much, the display period of the image data to be originally displayed. However, if the display period of the image data to be originally displayed is significantly reduced, the display of the image data to be originally displayed likely becomes imperfect because of poor response of the liquid crystal. That is, it takes a certain amount of time to completely set the orientation of liquid crystal molecules in accordance with the image data to be originally displayed. Thus, if the display period of the image data to be originally displayed is significantly reduced, the setting of the orientation of liquid crystal molecules to display the black image data is started before the orientation of liquid crystal molecules is completely set in accordance with the image data to be originally displayed. Thus, even in this technology, it is hard to increase the effect of eliminating the blur in the motion picture as equally as the CRT display does.

On the other hand, in the aforementioned technologies, there is such a problem that it is hard to increase the effect of eliminating the blur in the motion picture while preventing the generation of a flicker.

That is, in the technology disclosed in the aforementioned Japanese Patent Application Laid Open No. 2000-321993 or Japanese Patent Application Laid Open No. 2001-92370, if the light is out in the fluorescent tube in the long period, the flicker is likely generated on the display screen. Thus, in the technology, it is hard to increase the effect of eliminating the blur in the motion picture while preventing the generation of the flicker.

Moreover, even in the technology in which the black image data is inserted into the video data, if the light is out in the fluorescent tube in the long period, the flicker is likely generated on the display screen. Thus, even in the technology, it is hard to increase the effect of eliminating the blur in the motion picture while preventing the generation of the flicker.

In view of the above-exemplified problems, it is therefore a first object of the present invention to provide a backlight apparatus and a liquid crystal display apparatus which can increase the effect of eliminating the blur in the motion picture.

It is a second object of the present invention to provide a backlight apparatus and a liquid crystal display apparatus which can increase the effect of eliminating the blur in the motion picture while preventing the generation of the flicker.

Means for Solving the Subject

The above object of the present invention can be achieved by a backlight apparatus for providing light for a display panel apparatus which displays an image on a display screen by changing optical transmittance of a plurality of display units arranged on a display substrate, the backlight apparatus provided with: a support device; a plurality of light emitting elements, disposed on the support device, for producing a luminous point in a backlight area which is disposed behind the display panel apparatus; and a light emission controlling device for displacing the luminous point in the backlight area by changing light emission and non-emission of each of the light emitting elements or by changing intensities of lights emitted from the plurality of light emitting elements.

The above object of the present invention can be achieved by a liquid crystal display apparatus provided with: a liquid crystal display panel unit for displaying an image on a display screen by changing optical transmittance of a liquid crystal disposed between two display substrates; and a backlight unit for providing light for the liquid crystal display panel unit, the backlight unit provided with: a support device; a plurality of light emitting elements, disposed on the support device, for producing a luminous point in a backlight area which is disposed behind the liquid crystal display panel unit; and a light emission controlling device for displacing the luminous point in the backlight area by changing light emission and non-emission of each of the light emitting elements or by changing intensities of lights emitted from the plurality of light emitting elements.

BRIEF DESCRIPTION OF DRAWINGS

FIG. 1 is an exploded perspective view showing a first embodiment of the liquid crystal display apparatus of the present invention.

FIG. 2 is an explanatory view showing the arrangement of pixels in a display panel main body in FIG. 1.

FIG. 3 is an explanatory view showing the arrangement of light emitting elements in a backlight main body in FIG. 1.

FIG. 4 is a block diagram showing a backlight control device in FIG. 1.

FIG. 5 is an explanatory view showing one portion of the arrangement of the light emitting elements in the backlight main body in FIG. 1, a luminous point, and a luminous range.

FIG. 6 is an explanatory view showing one portion of the arrangement of the light emitting elements in the backlight main body in FIG. 1, and the displacement of the luminous point in a lateral direction.

FIG. 7 is an explanatory view showing one portion of the arrangement of the pixels in the backlight main body in FIG. 1, and the displacement of the luminous point in the lateral direction.

FIG. 8 is an explanatory view showing one portion of the arrangement of the light emitting elements in the backlight main body in FIG. 1, and the displacement of the luminous point in a longitudinal direction.

FIG. 9 is an explanatory view showing one portion of the arrangement of the pixels in the backlight main body in FIG. 1, and the displacement of the luminous point in the longitudinal direction.

FIG. 10 is a timing chart showing the synchronization between an image display operation and the displacement of the luminous point.

FIG. 11 is an explanatory view showing another embodiment of the backlight unit of the present invention.

FIG. 12 is a block diagram showing a backlight control device in a second embodiment of the liquid crystal display apparatus of the present invention.

FIG. 13 is an explanatory view showing a motion area and a luminous point displacement area, which are close to each other.

FIG. 14 is an explanatory view showing a motion area and a luminous point displacement area, which are away from each other.

FIG. 15 is an explanatory view showing a brightness information collecting process in the second embodiment of the liquid crystal display apparatus of the present invention.

FIG. 16 is a block diagram showing a liquid crystal television system in an example of the present invention.

DESCRIPTION OF REFERENCE CODES 10 liquid crystal display panel unit
11 display panel main body
12 liquid crystal control device
13, 14 display substrate
15 liquid crystal
16 display screen
17 pixel (display unit)
20 backlight unit
21 backlight main body
22, 30 backlight control device
23 support plate
24 light emitting element
26 backlight area 27, 31 light emission control device (light emission controlling device, lateral displacing device, longitudinal displacing device)
28 light amount adjusting device (first adjusting device)
32 motion area detecting device
33 light amount adjusting device (second adjusting device)
100 liquid crystal display apparatus
200 liquid crystal television system
207 liquid crystal control circuit
208 liquid crystal display panel main body
209 backlight control device
210 light emission control circuit
211 motion detection circuit
212 light amount adjustment circuit
213 backlight main body

BEST MODE FOR CARRYING OUT THE INVENTION

Hereinafter, the best mode for carrying out the invention will be explained in each embodiment in order, with reference to the drawings.

First Embodiment

FIG. 1 shows a first embodiment of the liquid crystal display apparatus of the present invention. A liquid crystal display apparatus 100 in FIG. 1 is an apparatus for displaying an image on a display screen. The liquid crystal display apparatus 100 is provided with: a liquid crystal display panel unit 10; and a backlight unit 20.

The liquid crystal display panel unit 10 is a unit for displaying an image on a display screen 16 by changing the light transmittance of a liquid crystal 15 disposed between two display substrates 13 and 14. The liquid crystal display panel unit 10 is provided with: a display panel main body 11; and a liquid crystal control device 12.

In the display panel main body 11, each of the display substrates 13 and 14 is, for example, a glass substrate. Each of the display substrates 13 and 14 is provided with: an oriented film on the inner surface facing the liquid crystal 15; and a polarizing plate on the outer surface. Moreover, each of the display substrates 13 and 14 is provided, for example, with a TFT (Thin Film Transistor) and a transparent electrode on the inner surface. Incidentally, the illustration of the oriented film, the polarizing plate, the TFT, and the transparent electrode is omitted.

The liquid crystal control device 12 applies a voltage to the liquid crystal 15 through the transparent electrode and the TFT, sets the orientation of molecules of the liquid crystal 15, and changes the light transmittance of the liquid crystal 15. The liquid crystal control device 12 is formed of e.g. a TFT driving circuit. The liquid crystal control device 12 is mounted, for example, in the vicinity of the frame portion of the display panel main body 11.

FIG. 2 shows the arrangement of pixels in the display panel main body 11. As shown in FIG. 2, pixels 17 are arranged in a matrix on the display substrate 14. For example, on the display substrate 14, the TFT is provided for each pixel 17. The liquid crystal control device 12 controls the voltage application in each TFT, to thereby set the orientation of molecules of the liquid crystal 15 in each pixel 17. An image displayed on the display screen 16 is formed by setting the orientation of molecules of the liquid crystal 15 in each pixel 17. That is, the pixel 17 is the display unit of the image.

Back in FIG. 1, the backlight unit 20 is a unit for providing light for the display panel main body 11. The backlight unit 20 is provided with: a backlight main body 21; and a backlight control device 22.

The backlight main body 21 is provided with: a support plate 23; a plurality of light emitting elements 24; and a diffuser plate 25.

The support plate 23 is a plate material having substantially the same area or a larger area than that of the display substrate 14, for example. There may be provided a reflector plate on a surface 23A of the support plate 23 facing the display panel main body 11. Moreover, the surface 23A has a backlight area 26 formed thereon. The backlight area 26 is disposed behind the display panel main body 11.

The light emitting elements 24 are disposed on the surface 23A of the support plate 23 to emit light toward the display panel main body 11. The plurality of light emitting elements 24 include a plurality of light emitting elements which emit red light (red light emitting elements), a plurality of light emitting elements which emit green light (green light emitting elements), and a plurality of light emitting elements which emit blue light (blue light emitting elements). The red light emitting element, the green light emitting element, and the blue light emitting element are arranged close to each other on the support plate 23, and the lights emitted from the respective three types of light emitting elements are mixed to thereby produce white light. The light emitting elements 24 are, for example, light emitting diodes (LED). By using the light emitting diodes as the light emitting elements 24, it is possible to obtain sufficiently high light intensity, and it is also possible to realize a high-speed change of light emission and non-emission and high-speed control of a light intensity change. For example, the light emitting elements 24 are formed of red light emitting diodes, green light emitting diodes, and blue light emitting diodes.

Incidentally, the individual light emitting elements 24 may be formed of light emitting elements which emit the white light alone, e.g. white light emitting diodes. However, some of the white light emitting diodes emit not pure white light but bluish white light, so that it is not preferable to use such white light emitting diodes from the viewpoint of increasing a performance about the color of the backlight. In contrast, if the light emitting elements 24 are formed of the red light emitting elements, the green light emitting elements, and the blue light emitting elements, it is possible to produce the pure white light, easily.

The backlight main body 21 is mounted on the rear surface of the display panel main body 11, with the diffuser plate 25 therebetween. By this, the white light produced by the light emitting elements 24 is provided for the display panel main body 11 from the rear of the display panel main body 11, as the backlight. Incidentally, FIG. 11 shows the support plate 23 provided with the light emitting elements 24, the diffuser plate 25, and the display panel main body 11 in an exploded manner.

FIG. 3 shows the arrangement of the light emitting elements 24 in the backlight main body 21. As shown in FIG. 3, the light emitting elements 24 are arranged in a matrix of m-rows and n-columns in the backlight area 26 formed on the support plate 23. The light emitting elements 24 are arranged so as to repeat an arrangement pattern of the red light emitting element (R), the green light emitting element (G), and the blue light emitting element (B), a plurality of times, in the lateral direction of the backlight area 26. Incidentally, the light emitting elements 24 may be arranged in a staggered shape.

FIG. 4 shows the backlight control device 22. As shown in FIG. 4, the backlight control device 22 is provided with: a light emission control device 27; and a light amount adjusting device 28. The backlight control device 22 is mounted, for example, in the surroundings of the backlight are 26 on the surface 23A of the support plate 23, or on the rear surface of the support plate 23, or the like.

The light emission control device 27 controls the light emission of each light emitting element 24. Specifically, the light emission control device 27 changes the light emission and non-emission of each light emitting element 24, controls the intensities of the lights emitted from the light emitting elements 24, or the like. The light emission control device 27 is desirably adapted to change the light emission and non-emission and controls the light intensity, for each of the individual light emitting elements 24. If the light emitting elements 24 are light emitting diodes, the light emission control device 27 is, for example, a voltage control circuit for controlling a voltage applied to each of the individual light emitting diodes. As described later, the backlight unit 20 employs a luminous point displacement mode and an overall light emission mode, with regard to the light emitting method of each light emitting element 24. The light emission control device 27 selects either the luminous point displacement mode or the overall light emission mode, on the basis of the type of the image, or in accordance with a user's instruction. The light emitting control by the light emission control device 27 varies depending on the luminous point displacement mode and the overall light emission mode. Incidentally, the light emission control device 27 is a specific example of the light emitting controlling device, the lateral displacing device, and the longitudinal displacing device.

The light amount adjusting device 28 adjusts the intensities or the like of the lights emitted from the light emitting elements 24 in order to eliminate or reduce a difference between a light amount in the entire backlight area 26 in performing the luminous point displacement mode and a light amount in the entire backlight area 26 in performing the overall light emission mode. The light amount adjusting device 28 is provided, for example, with: a memory apparatus for storing brightness information; and an adjustment circuit for adjusting the voltage applied to each light emitting element 24 from the light emission control device 27, on the basis of the brightness information. Incidentally, the light amount adjusting device 28 is a specific example of the first adjusting device.

The backlight unit 20 operates as follows, for example. The backlight unit 20 employs two types of methods, with regard to the light emitting method of each light emitting element 24; namely, the luminous point displacement mode and the overall light emission mode. The luminous point displacement mode is a method of displacing the luminous point in the backlight area 26 by changing the intensities of the lights emitted from the light emitting elements 24 or by changing the light emission and non-emission of each light emitting element 24. In the luminous point displacement mode, the point of light produced by the backlight unit is displaced in the display screen 16 as similarly as the electron beam of the CRP display apparatus scans the display screen. On the other hand, the overall light emission mode is a method of making the entire backlight area 26 emit light by substantially equalizing the intensities of the lights emitted from the light emitting elements 24. In the overall light emission mode, the light is provided in unison for the entire display screen 16, similarly to the backlight of a conventional liquid crystal display apparatus.

The light emission control device 27 selects either the luminous point displacement mode or the overall light emission mode, on the basis of the type of the image. For example, the light emission control device 27 judges whether or not the image displayed on the display screen 16 of the display panel main body 11 is a motion picture or a still image. Then, if the image displayed on the display screen 16 is the motion picture, the light emission control device 27 selects the luminous point displacement mode. On the other hand, if the image displayed on the display screen 16 is the still image, the light emission control device 27 selects the overall light emission mode. Whether the image is the motion picture or the still image can be judged on the basis of identification information (e.g. an identifier) appended to the image data.

Alternatively, the light emission control device 27 selects either the luminous point displacement mode or the overall light emission mode, in accordance with the user's instruction. For example, the user operates an operation switch or a remote controller (both are not illustrated) mounted on the liquid crystal display apparatus 100, and inputs an instruction to specify the luminous point displacement mode or the overall light emission mode. The light emission control device 27 selects either the luminous point displacement mode or the overall light emission mode, in accordance with this instruction.

When selecting the luminous point displacement mode, the light emission control device 27 changes the intensities of the lights emitted from the light emitting elements 24 and changes the light emission and non-emission of each light emitting element 24, to thereby produce the luminous point in the backlight area 26 and displace the luminous point. Incidentally, in the explanation below, the light emitting element 24 disposed in an X column and a Y row in the backlight area 26 is expressed as a light emitting element (X, Y).

That is, the light emission control device 27 firstly produces the luminous point in the backlight area 26. Specifically, the light emission control device 27 selects about three to five light emitting elements 24 continuously aligned in the lateral direction from among the light emitting elements 24 arranged in the backlight area 26, makes the selected light emitting elements 24 emit light, and stops the light emission of all the remaining light emitting elements 24.

For example, as shown in FIG. 5, the light emission control device 27 illuminates a light emitting element (1,1), a light emitting element (2,1), and a light emitting element (3,1) from among the light emitting elements 24 arranged in the backlight area 26, puts out the other light emitting elements 24. The light emission of the light emitting element (1,1), the light emitting element (2,1), and the light emitting element (3,1) produces the luminous point at a position P1 in the back light area 26, and further produces a luminous range R1 in the surroundings of this luminous point. The light intensity or light amount at the luminous point is greater than those in another area in the luminous range R1. The light emitting element (1,1), the light emitting element (2,1), and the light emitting element (3,1) are the red light emitting element, the green light emitting element, and the blue light emitting element, respectively, and emit the red light, the green light, and the blue light, respectively. Then, the light emission control device 27 sets each of the intensities of the lights emitted from the light emitting element (1,1), the light emitting element (2,1), and the light emitting element (3,1) such that the luminous point is pure white. As a result, the light at the luminous point and in the light emitting range R1 is pure white.

Then, the light emission control device 27 displaces the luminous point so as to be along the arrangement of the pixels 17 in the display screen 16. The light emission control device 27 firstly displaces the luminous point in the lateral direction of the backlight area 26. Specifically, the light emission control device 27 displaces the luminous point such that the position of the luminous point sequentially matches the position of each of the pixels which are aligned in the lateral direction of the display substrate 14 or the display screen 16. The displacement in the lateral direction of the luminous point is performed by changing the light emission and non-emission of all or part of about three to five light emitting elements 24 continuously aligned in the lateral direction of the backlight area 26 or by changing each of the intensities (or intensity ratio) of the lights emitted from all or part of about three to five light emitting elements 24 continuously aligned in the lateral direction of the backlight area 26.

For example, as shown in FIG. 6, the light emission control device 27 displaces the luminous point from the position P1 to a position P2, from the position P2 to a position P3, and from the position P3 to a position P4, sequentially. When the luminous point is displaced from the position P1 to the position P4, the luminous range is also displaced in the order of R1, R2, R3, and R4. The displacement of the luminous point and the luminous range described above is performed by changing the light emission and non-emission of the light emitting element (1,1), the light emitting element (2,1), the light emitting element (3,1), and a light emitting element (4,1) and by changing each of the intensities of the lights emitted from these light emitting elements, as occasion demands. That is, when the luminous point is displaced from the position P1 to the position P4, the light emission control device 27 gradually reduces the light intensity of the light emitting element (1,1). At the same time, the light emission control device 27 firstly makes the light emitting element (4,1) emit light at a low light intensity, and then gradually increases the light intensity of this light emitting element. As a result, as shown in FIG. 7, the luminous point is displaced so as to match the position of each of the pixels 17 aligned in the lateral direction of the display screen 16. Incidentally, an arrow AR1 in FIG. 7 shows a direction that the luminous point is displaced. The light emission control device 27 displaces the luminous point in the lateral direction of the display screen 16 from the pixel located on one edge to the pixel located on the other edge.

Then, the light emission control device 27 displaces the luminous point in the longitudinal direction of the backlight area 26. Specifically, the light emission control device 27 displaces the luminous point such that the position of the luminous point matches the position of each of the pixels 17 arranged in the longitudinal direction of the display screen 16 or the display substrate 14. The displacement in the longitudinal direction of the luminous point is performed by changing the light emission and non-emission of all or part of about six to ten light emitting elements 24 continuously aligned in the longitudinal direction of the backlight area 26 or by changing each of the intensities (or intensity ratio) of the lights emitted from all or part of about six to ten light emitting elements 24 continuously aligned in the longitudinal direction of the backlight area 26.

For example, as shown in FIG. 8, the light emission control device 27 displaces the luminous point along the pixels arranged in the first row of the display screen 16 and then displaces the luminous point to a position P5. Then, the light emission control device 27 displaces the luminous point along the pixels arranged in the second row of the display screen 16 and then displaces the luminous point to a position P6. Then, the light emission control device 27 displaces the luminous point along the pixels arranged in the third row of the display screen 16 and then displaces the luminous point to a position P7. As the position of the luminous point is changed, the luminous range is also changed in the order of R5, R6, and R7. The displacement of the luminous point to the positions P5, P6, and P7 is performed by changing the light emission and non-emission of the light emitting element (1,1), the light emitting element (2,1), the light emitting element (3,1), a light emitting element (1,2), a light emitting element (2,1), and a light emitting element (3,2), and by changing each of the intensities of the lights emitted from these light emitting elements, as occasion demands. That is, when the luminous point is displaced along the pixels arranged in the first row of the display screen 16 and then to the position P5, the light emission control device 27 reduces the light intensities of the light emitting element (1,1), the light emitting element (2,1), and the light emitting element (3,1). At the same time, the light emission control device 27 makes the light emitting element (1,2), the light emitting element (2,2), and the light emitting element (3,2) emit light at low light intensities. Then, when the luminous point is displaced along the pixels arranged in the second row of the display screen 16 and then to the position P6, the light emission control device 27 further reduces the light intensities of the light emitting element (1,1), the light emitting element (2,1), and the light emitting element (3,1). At the same time, the light emission control device 27 increases the light intensities of the light emitting element (1,2), the light emitting element (2,2), and the light emitting element (3,2). Then, when the luminous point is displaced along the pixels arranged in the third row of the display screen 16 and then to the position P7, the light emission control device 27 further reduces the light intensities of the light emitting element (1,1), the light emitting element (2,1), and the light emitting element (3,1). At the same time, the light emission control device 27 further increases the light intensities of the light emitting element (1,2), the light emitting element (2,2), and the light emitting element (3,2). As a result, as shown in FIG. 9, the luminous point is displaced so as to match the position of each of the pixels 17 arranged in the longitudinal direction of the display screen 16.

The light emission control device 27 repeats the displacement of the luminous point in the lateral direction and the longitudinal direction, to thereby displace the luminous point so as to be along the arrangement of the pixels 17 in the display screen 16. By this, the point-like light produced by the light emitting elements 24 and the light emission control device 27 sequentially irradiates all the pixels 17 in the display screen 16 as if the electron beam of the CRT display apparatus scanned the display screen. So to speak, the display screen is scanned by the backlight.

Moreover, the light emission control device 27 synchronizes the displacement of the luminous point with the image display operation of the liquid crystal display panel unit 10. Specifically, the light emission control device 27 controls the displacement of the luminous point such that a luminous point displacement period, which is from the start to the end of the displacement of the luminous point, is shorter than one cycle of an image display period in which one image (image of one screen) is displayed on the display screen 16 on the liquid crystal display panel unit 10.

For example, in FIG. 10, a period D1 indicates, for example, one cycle (e.g. ⅟₆₀ seconds) of the image display period in which one field of image is displayed on the display screen 16. Moreover, a period D2 indicates a period between when the setting of the orientation of molecules of the liquid crystal 15 is started to display the image and when the orientation of molecules of the liquid crystal 15 becomes in the situation that the image can be appropriately displayed. The period D2 is determined in view of the response of the liquid crystal 15. Moreover, a period D3 indicates the luminous point displacement period, which is from the start to the end of the displacement of the luminous point For example, the luminous point displacement period D3 is a period starting from when the luminous point starts to be displaced from a position corresponding to the pixel 17 disposed at the uppermost edge and the leftmost edge of the display screen 16 to when the luminous point reaches to a position corresponding to the pixel 17 disposed at the lowermost edge and the rightmost edge of the display screen 16. As shown in FIG. 10, the displacement of the luminous point is started after the orientation of molecules of the liquid crystal 15 becomes in the situation that the image can be appropriately displayed. Then, the displacement of the luminous point is completed by the time the one cycle of the image display period ends.

When the motion picture is displayed on the liquid crystal display panel unit 10, an image with a motion is displayed on the display screen 16 one after another in each one field. In such a case, the luminous point is displaced from the position corresponding to the pixel 17 disposed at the uppermost edge and the leftmost edge of the display screen 16 to the position corresponding to the pixel 17 disposed at the lowermost edge and the rightmost edge of the display screen 16, in each one field, in the luminous point displacement period D3.

On the other hand, when the overall light emission mode is selected, the light emission control device 27 simultaneously and continuously makes all the light emitting elements 24 arranged in the backlight area 26 emit light and maintains the constant intensity of the lights emitted from all the light emitting elements 24. By this, the entire backlight area 26 emits light with uniform brightness, and the emission is maintained, for example, while the still image is displayed on the display screen 16.

On the other hand, the light amount adjusting device 28 in FIG. 4 adjusts the intensities of the lights emitted from the light emitting elements 24 or the like so as to eliminate or reduce the difference between the light amount in the entire backlight area 26 in performing the luminous point displacement mode and the light amount in the entire backlight area 26 in performing the overall light emission mode. As described above, the light amount adjusting device 28 is provided, for example, with: the memory apparatus; and the adjustment circuit.

The memory apparatus stores therein, for example, the brightness information about the entire backlight area 26 in performing the luminous point displacement mode and the brightness information about the entire backlight area 26 in performing the overall light emission mode.

The brightness information is generated and stored as follows, for example. That is, at the start of use of the liquid crystal display apparatus 100, the user inputs an instruction to adjust the brightness, to the liquid crystal display apparatus 100. In response to this, the backlight unit 20 performs a brightness information collecting process. In the brightness information collecting process, the backlight unit 20 makes the light emitting elements 24 emit light in the overall light emission mode, measures this time's average brightness, and stores the measurement result. Then, the backlight unit 20 makes the light emitting elements 24 emit light in the luminous point displacement mode, measures this time's average brightness, and stores the measurement result. The measurement of the average brightness is desirably performed on several points of the display screen 16 or the backlight area 26. By this, it is possible to inhibit the spread of the brightness.

The adjustment circuit adjusts the voltage applied to each light emitting element 24 from the light emission control device 27, on the basis of the brightness information stored in the memory apparatus described above, to thereby set a light intensity range or a ratio of light intensity change or the like of each light emitting element 24 in performing the luminous point displacement mode and set the light intensity or the like of each light emitting element 24 in performing the overall light emission mode.

As explained above, on the backlight unit 20, the luminous point is displaced in the backlight area 26 in performing the luminous point displacement mode. That is, since the point-like light formed by controlling the light emission of the light emitting elements 24 is displaced on the backlight unit 20, it is only a brief moment that the light is emitted from the same place (or a partial small area) in the display screen 16. In other words, it is long that the light is out in the same place in the display screen 16. Thus, according to the backlight unit 20, it is possible to achieve the sufficient effect of eliminating the blur in the motion picture.

Moreover, on the backlight unit 20, the luminous point is displaced in the lateral direction and the longitudinal direction of the backlight area so as to be along the arrangement of the pixels. The motion of the luminous point is substantially the same as that of the scanning by the electron beam in the CRT display apparatus. By this, it is possible to increase the effect of eliminating the blur in the motion picture as equally as the CRT display does.

Moreover, the light emitting elements 24 are arranged to repeat an arrangement pattern of the red light emitting element, the green light emitting element, and the blue light emitting element, a plurality of times, in the lateral direction of the backlight area 26. The light emission control device 27 displaces the luminous point in the lateral direction by changing the intensity ratio of the lights emitted from the respective two or more adjacent light emitting elements having such an arrangement pattern. That is, as shown in FIG. 6, when displacing the luminous point from the position P1 to the position P4, the light emission control device 27 gradually reduces the light intensity of the light emitting element (1,1). At the same time, the light emission control device 27 gradually increases the light intensity of the light emitting element (4,1). By this, it is possible to continuously displace the luminous point in the lateral direction while keeping the light color pure white at the luminous point and in the luminous ratio.

Moreover, the light emission control device 27 changes the intensity ratio of the lights emitted from the respective two or more light emitting elements adjacent to each other in the longitudinal direction, to thereby displace the luminous point in the longitudinal direction. By this, it is possible to displace the luminous point in the longitudinal direction, continuously (or finely by a small displace amount or distance).

Moreover, on the backlight unit 20, the luminous point is displaced (in the luminous displacement mode) if the image is the motion picture, and the entire backlight area 26 emits light (in the overall light emission mode) if the image is the still image. As described above, in the still image display in which the flicker is highly visible, it is possible to effectively inhibit the generation of the flicker by illuminating the entire backlight area 26.

Moreover, on the backlight unit 20, the brightness is uniformed in performing the luminous point displacement mode and in performing the overall light emission mode. By this, the image display is stabilized, and the higher image quality can be achieved.

Incidentally, on the backlight unit 20, the point-like light formed by controlling the light emission of the light emitting elements 24 is displaced in performing the luminous displacement mode. Thus, if attention is focused only on an extremely small area in the display screen, for example, it is only a brief moment (e.g. a short period of u sec order) that the light is emitted from the small area to the eyes of a human in a period of one field. However, by forming the light emitting elements 24 of the light emitting diodes, it is possible to produce the point-like light with a sufficiently high light intensity, and it is also possible to displace the point-like light at high speed. This can have the same residual effect on a human as the effect caused by the displacement of the electron beam in the CRT display apparatus. As a result, the human cannot recognize the displacement of the point-like light in the display screen 16 or the backlight area 26, and recognizes as if the entire display screen 16 or the entire backlight area 26 emitted light, simultaneously and continuously.

Moreover, the backlight unit 20 employs a luminous point displacing method in which the backlight unit 20 firstly displaces the luminous point in the right direction from the left edge to the right edge along the pixel arrangement in the first row, then displaces down the luminous point, and then displaces the luminous point in the right direction from the left edge to the right edge along the pixel arrangement in the second row. The luminous point displacing method, however, is not limited to this. For example, it may be a luminous point displacing method in which the backlight unit 20 firstly displaces the luminous point in the right direction from the left edge to the right edge along the pixel arrangement in the first row, then displaces down the luminous point, and then displaces the luminous point in the left direction from the right edge to the left edge along the pixel arrangement in the second row. Alternatively, it may be a luminous point displacing method in which the backlight unit 20 displaces down the luminous point from the upper edge to the lower edge along the pixel arrangement in the first column, then displaces the luminous point in the right direction, and then displaces down the luminous point from the upper edge to the lower edge along the pixel arrangement in the second column.

Moreover, the backlight unit 20 employs a luminous point displacing method in which the luminous point is displaced such that the luminous point matches each and every pixel in the display screen 16, i.e. such that all the pixels are perfectly scanned. The luminous point displacing method, however, is not limited to this. For example, the backlight unit 20 may employ a luminous point displacing method in which the pixels are scanned every a few rows or every a few columns.

Moreover, it is exemplified that the light emitting elements 24 are arranged in a matrix in the backlight area 26 which is disposed behind the display panel main body 11 on the backlight unit 20; however, the present invention is not limited to this. For example, as shown in FIG. 11, light emitting elements 124 may be arranged in the surroundings of a backlight area 126 on a support plate 123, and a light guiding member 125 may be disposed in the backlight area 126, to thereby guide the lights emitted from the light emitting elements 124 to the rear of the display panel main body 1 through the light guiding member 125. In this case, for example, what are illuminated are the first light emitting element (red), the second light emitting element (green), and the light emitting element (blue) of the light emitting elements 124 arranged on the upper side of the backlight area 126, the first light emitting element (red), the second light emitting element (green), and the light emitting element (blue) of the light emitting elements 124 arranged on the lower side of the backlight area 126, the first light emitting element (red), the second light emitting element (green), and the light emitting element (blue) of the light emitting elements 124 arranged on the left side of the backlight area 126, and the first light emitting element (red), the second light emitting element (green), and the light emitting element (blue) of the light emitting elements 124 arranged on the right side of the backlight area 126, and the other light emitting elements 24 are put out. By this, it is possible to produce a luminous point at a position P11 in the backlight area 126. Then, by controlling the light emission and non-emission and the light intensities of the light emitting elements arranged on the upper side and the lower side of the backlight area 126, it is possible to displace the luminous point in the lateral direction. Moreover, by controlling the light emission and non-emission and the light intensities of the light emitting elements arranged on the left side and the right side of the backlight area 126, it is possible to displace the luminous point in the longitudinal direction. Incidentally, not the light emitting elements but a reflector plate may be provided on either the lower side or the upper side of the backlight area 126. Moreover, not the light emitting elements but a reflector plate may be provided on either the left side or the right side of the backlight area 126.

Second Embodiment

FIG. 12 shows a backlight control device of a backlight unit in a second embodiment of the liquid crystal display apparatus of the present invention. On the backlight unit in the second embodiment, an area with a motion in the image displayed on the display screen, i.e. a motion area, is detected, and luminous point is displaced only in a partial area in the backlight area corresponding to the motion area, or only in a partial area in the backlight area corresponding to a partial area in the display screen including the motion area. Incidentally, the structure of the second embodiment of the liquid crystal display apparatus is the same as that of the first embodiment of the liquid crystal display apparatus, except for a backlight control device 30 shown in FIG. 12.

As shown in FIG. 12, the backlight control device 30 of the backlight unit in the second embodiment is provided with: a light emission control device 31; a motion area detecting device 32; and a light amount adjusting device 33.

The light emission control device 31, as in the light emission control device 27 in the first embodiment, controls the light emission and non-emission of each light emitting element or the light intensity of each light emitting element. The light emission control device 31 is, for example, a voltage control circuit for controlling a voltage applied to each of individual light emitting diodes. Incidentally, the light emission control device 31 is a specific example of the light emitting controlling device, the lateral displacing device, and the longitudinal displacing device.

The motion area detecting device 32 detects the area with a motion in the image displayed on the display screen, i.e. the motion area. Moreover, the motion area detecting device 32 sets a partial area in the backlight area corresponding to the motion area, or a partial area in the backlight area corresponding to a partial area in the display screen including the motion area (hereinafter referred to as a "luminous point displacement area"). The motion area detecting device 32 is formed, for example, of an arithmetic processing circuit or the like.

The light amount adjusting device 33 adjusts the intensities of the lights emitted from the light emitting elements or the like, so as to eliminate or reduce a difference between a light amount in the luminous point displacement area and a light amount in an area other than the luminous point displacement area. The light amount adjusting device 33 is formed, for example, of a memory apparatus and an adjustment circuit. Incidentally, the light amount adjusting device 33 is a specific example of the second adjusting device.

The backlight control device 30 operates as follows, for example. In performing the luminous point displacement mode, the motion area detecting device 32 detects the motion area of the image displayed on the display screen. The detection of the motion area can be performed by using e.g. motion information obtained in a MPEG decoding process (e.g. difference information about the image between two fields or two frames).

Then, the motion area detecting device 32 sets the luminous point displacement area in the backlight area. The luminous point displacement area in the backlight area can be set by performing an operation or calculation on the basis of the motion information. For example, as shown in FIG. 13, in the image displayed on the display screen 16, if a plurality of motion areas 41 and 42 are close to each other, a luminous point displacement area 43 is set including partial areas of the backlight area corresponding to the plurality of motion areas 41 and 42. On the other hand, as shown in FIG. 14, if a plurality of motion areas 51 and 52 are away from each other, luminous point displacement areas 53 and 54 are set for the respective motion areas 51 and 52.

Then, the motion area detecting device 32 outputs position information for specifying the luminous point displacement area to the light emission control device 31. For example, if the shape of the luminous point displacement area is quadrate in which the direction of each side is along the arrangement direction of the pixels, as shown in FIG. 13 or FIG. 14, the motion area detecting device 32 outputs coordinate information which indicates the coordinates of the uppermost edge and the leftmost edge of the luminous point displacement area and coordinate information which indicates the coordinates of the lowermost edge and the rightmost edge of the luminous point displacement area, to the light emission control device 31.

Then, the light emission control device 31 specifies the luminous point displacement area on the basis of the position information (or coordinate information) outputted from the motion area detecting device 32. Then, the light emission control device 31 displaces the luminous point in the luminous point displacement area. The displacement of the luminous point is performed so as to be along the pixels arranged in the area in the display screen corresponding to the luminous point displacement area. That is, the light emission control device 31 displaces the luminous point in the luminous point displacement area as if the pixels were scanned with the point-like light produced by the light emitting elements. For example, if the shape of the luminous point displacement area is quadrate in which the direction of each side is along the arrangement direction of the pixels, as shown in FIG. 13 or FIG. 14, the light emission control device 31 displaces the luminous point from the position at the uppermost edge and the leftmost edge of the luminous point displacement area to the position at the lowermost edge and the rightmost edge of the luminous point displacement area. Moreover, the light emission control device 31 sets the displacement speed of the luminous point such that the displacement of the luminous point is completed in the luminous point displacement period D3 (refer to FIG. 10).

Moreover, simultaneously with the displacement of the luminous point in the luminous point displacement area, the light emission control device 31 simultaneously and continuously makes all the light emitting elements emit light, which are arranged in the area other than the luminous point displacement area in the backlight area, and maintains the constant intensity of the lights emitted from all the light emitting elements. By this, the entire backlight area other than the luminous point displacement area emits light with uniform brightness, and the emission is maintained, for example, in a period of one field.

On the other hand, the light amount adjusting device 33 adjusts the intensities of the lights emitted from the light emitting elements or the like, so as to eliminate or reduce the difference between the light amount in the luminous point displacement area and the light amount in an area other than the luminous point displacement area. For example, the light amount adjusting device 33 stores, in the memory apparatus, e.g. ten combinations of area information about the luminous point displacement area temporarily set in the backlight area, the brightness information in the luminous point displacement area, and the brightness information in the area other than the luminous point displacement area in the backlight area.

The combination of the brightness information is generated and stored as follows, for example. That is, at the start of use of the liquid crystal display apparatus, the user inputs an instruction to adjust the brightness, to the liquid crystal display apparatus. In response to this, the backlight unit performs the brightness information collecting process. In the brightness information collecting process, the backlight unit sets a luminous point displacement area 61 whose area is determined in advance, in the backlight area 26, as shown in FIG. 15. Then, the backlight unit makes the light emitting elements emit light in the luminous point displacement area 61 in the luminous point displacement mode, and displaces the luminous point produced by the light emission in the luminous point displacement area 61. Then, the backlight unit measures this time's average brightness. Then, the backlight unit makes the entire backlight area 26 emit light with uniform brightness, except for the luminous point displacement area 61, and measures this time's average brightness. Then, the backlight unit combines the area information which indicates the area of the luminous point displacement area 61, the brightness information which indicates the average brightness in the luminous point displacement area 61, and the brightness information which indicates the average brightness in the area other than the luminous point displacement area 61, and stores the combination of the information into the memory apparatus of the light amount adjusting device 33.

Then, the backlight unit sets a luminous point displacement area 62 whose area is determined in advance, in the backlight area 26. The area of the luminous point displacement area 62 is larger than the area of the luminous point displacement area 61. Then, the backlight unit makes the light emitting elements emit light in the luminous point displacement area 62 in the luminous point displacement mode, and displaces the luminous point produced by the light emission in the luminous point displacement area 62. Then, the backlight unit measures this time's average brightness. Then, the backlight unit makes the entire backlight area 26 emit light with uniform brightness, except for the luminous point displacement area 62, and measures this time's average brightness. Then, the backlight unit combines the area information which indicates the area of the luminous point displacement area 62, the brightness information which indicates the average brightness in the luminous point displacement area 62, and the brightness information which indicates the average brightness in the area other than the luminous point displacement area 62, and stores the combination of the information into the memory apparatus of the light amount adjusting device 33.

In the same manner, the backlight unit sequentially sets luminous point displacement areas 63, 64, to 70 which are different in area, and performs the measurement of the average brightness in the luminous point displacement area, the measurement of the average brightness in the area other than the luminous point displacement area, and the storing of the area information and the brightness information, for each of luminous point displacement areas. As a result, the memory apparatus of the light amount adjusting device 33 stores therein ten combinations of the area information and the brightness information.

Incidentally, the combination of the brightness information and the like collected in the brightness information collecting process is not limited to ten. For example, more luminous point displacement areas which are different in area may be set to correct more brightness information. Moreover, a plurality of luminous point displacement areas which are the same in area may be sequentially set at different positions in the backlight area 26 to correct more brightness information.

The adjustment circuit of the light amount adjusting device 33 adjusts the voltage applied to each light emitting element from the light emission control device 31, on the basis of the area information and the brightness information stored in the memory apparatus described above, to thereby set a light intensity range or a ratio of light intensity change or the like of each of the light emitting elements which produce the luminous point in the luminous point displacement area and set the light intensity or the like of each of the light emitting elements which emit light with uniform brightness in the area other than the luminous point displacement area. Specifically, the adjustment circuit selects the area information which indicates the closest area to the area of the luminous point displacement area set by the motion area detecting device 32, from among the area information stored in the memory apparatus. Then, the adjustment circuit sets the light intensity or the like of each light emitting element on the basis of the brightness information combined with the selected area information.

As explained above, on the backlight unit in the second embodiment, the motion area in the image displayed on the display screen is detected, and the luminous point is displaced only in the luminous point displacement area. Then, the luminous point is not displaced in the area other than the luminous point displacement area in the backlight area, but the entire area emits light with uniform brightness. By this, in the luminous point displacement area, it is possible to increase the effect of eliminating the blur in the motion picture as equally as the CRT display does. In the area other than the luminous point displacement area, it is possible to inhibit the flicker. That is, according to the backlight unit in the second embodiment, it is possible to realize the inhibition of the flicker and the effect of eliminating the blur in the motion picture, at the same time and in a balanced manner.

EXAMPLE

Hereinafter, the example of the present invention will be explained with reference to FIG. 16. In the following example, the backlight apparatus or the liquid crystal display apparatus of the present invention is applied to a liquid crystal television system.

In a liquid crystal television system 200 in FIG. 16, a digital television signal transmitted from a television broadcast station is received by an antenna 201 and inputted to a digital tuner 202. The digital tuner 202 extracts image data about one program from among the digital television signal, and supplies this to a MPEG decoder 203. The MPEG decoder 203 cooperates with a buffer memory 204, to thereby decode the image data, and supplies the decoded image data to a frame memory 205. An image control circuit 206 generates interpolated image data or the like if necessary. The frame memory 205 holds the image data decoded by the MPEG decoder 203 or the interpolated image data generated by the image control circuit 206, or the like, and supplies the image data to a liquid crystal control circuit 207 in predetermined timing. The supply timing of the image data to the liquid crystal control circuit 207 is set on the basis of a synchronization signal generated by a synchronization signal generation circuit 214. The liquid crystal control circuit 207 generates a TFT driving signal on the basis of the supplied image data, and supplies this signal to a liquid crystal display panel main body 208. By this, a TFT disposed in the liquid crystal display panel main body 208 allows the orientation of molecules of a liquid crystal disposed in the liquid crystal display panel main body 208 to be set in accordance with the image data.

On the other hand, the MPEG decoder 203 supplies motion information obtained in the procedure of the decoding process to a motion detection circuit 211 of a backlight control device 209. If a luminous point displacement mode is selected, the motion detection circuit 211 detects a motion area of an image displayed on the display screen of the liquid crystal display panel main body 208, on the basis of the motion information. Then, the motion detection circuit 211 sets a luminous point displacement area in a backlight area. Then, the motion detection circuit 211 outputs position information for specifying the luminous point displacement area, to a light emission control circuit 210. Then, the light emission control circuit 210 specifies the luminous point displacement area on the basis of the position information outputted from the motion detection circuit 211.

In the backlight area of a backlight main body 213, a plurality of light emitting elements are arranged in a matrix. The light emission control circuit 210 performs the change of the light emission and non-emission and the control of the light intensities of the light emitting elements, on each of the light emitting elements. Specifically, the light emission control circuit 210 changes the light emission and non-emission of the light emitting elements arranged in the luminous point displacement area from among the light emitting elements arranged in the backlight area, and changes the light intensities of the light emitting elements which are emitting light, to thereby produce the luminous point (or point-like light) in the luminous point displacement area and displace the luminous point in the luminous point displacement area. Moreover, the light emission control circuit 210 displaces the luminous point on the basis of the synchronization signal generated by the synchronization signal generation circuit 214, to thereby synchronize the displacement of the luminous point with the image display operation of the liquid crystal control circuit 207 and the liquid crystal display panel main body 208.

Moreover, simultaneously with the displacement of the luminous point in the luminous point displacement area, the light emission control circuit 210 simultaneously and continuously makes all the light emitting elements emit light, which are arranged in an area other than the luminous point displacement area in the backlight area, and maintains the constant intensity of the lights emitted from all the light emitting elements.

On the other hand, a light amount adjustment circuit 212 adjusts a voltage applied to each light emitting element from the light emission control circuit 210, to thereby adjust the intensities of the lights emitted from the light emitting elements so as to eliminate or reduce a difference between a light amount in the luminous point displacement area and a light amount in the area other than the luminous point displacement area.

A CPU 215 controls the operation of each element, each circuit, each part, or each apparatus of the liquid crystal television system 200 described above.

According to the liquid crystal television system 200 described above, by displacing the luminous point in the luminous point displacement area set in the backlight area of the backlight main body 213, it is possible to reduce or eliminate a blur in a motion picture displaced on the display screen of the liquid crystal display panel main body 208. At the same time, by making the entire area emit light with uniform brightness, except for the luminous point displacement area in the backlight area, it is possible to inhibit the generation of the flicker in the area. As described above, according to the liquid crystal television system 200, it is possible to increase the effect of eliminating the blur in the motion picture while inhibiting the generation of the flicker.

Incidentally, the aforementioned explanation exemplifies that the backlight apparatus or the liquid crystal display apparatus of the present invention is applied to the liquid crystal television system; however, the present invention is not limited to this. For example, the present invention can be applied to electronic paper with a backlight.

Moreover, in the present invention, various changes may be made, if desired, without departing from the essence or spirit of the invention which can be read from the claims and the entire specification. A backlight apparatus and a liquid crystal display apparatus, which involve such changes, are also intended to be within the technical scope of the present invention.

INDUSTRIAL APPLICABILITY

The backlight apparatus and the liquid crystal display apparatus of the present invention can be applied to, for example, a television and a monitor for a personal computer.

The invention claimed is:

1. A backlight apparatus for providing light for a display panel apparatus which displays an image on a display screen by changing optical transmittance of a plurality of display units arranged on a display substrate, said backlight apparatus comprising:
   a support device;
   a plurality of light emitting elements, disposed on said support device, for producing a luminous point in a backlight area which is disposed behind the display panel apparatus; and
   a light emission controlling device for displacing the luminous point continuously in a direction of the adjacent light emitting element in the backlight area by changing light emission and non-emission of each of said light emitting elements or by changing intensities of lights emitted from said plurality of light emitting elements.

2. The backlight apparatus according to claim 1, wherein said light emission controlling device displaces the luminous point so as to be along the arrangement of the plurality of display units.

3. The backlight apparatus according to claim 1, wherein said light emission controlling device comprises:
   a lateral direction displacing device for displacing the luminous point in a lateral direction of the backlight area; and
   a longitudinal direction displacing device for displacing the luminous point in a longitudinal direction of the backlight area.

4. The backlight apparatus according to claim 3, wherein the lateral direction displacing device displaces the luminous point such that a position of the luminous point sequentially matches a position of each of the display units aligned in a lateral direction of the display substrate.

5. The backlight apparatus according to claim 3, wherein the longitudinal direction displacing device displaces the luminous point such that a position of the luminous point sequentially matches a position of each of the display units aligned in a longitudinal direction of the display substrate.

6. The backlight apparatus according to claim 1, wherein said light emission controlling device displaces the luminous point by changing a intensity ratio of lights emitted from respective two or more light emitting elements adjacent to each other.

7. The backlight apparatus according to claim 1, wherein said light emitting elements are light emitting diodes.

8. The backlight apparatus according to claim 1, wherein said plurality of light emitting elements are arranged in a matrix in the backlight area.

9. The backlight apparatus according to claim 1, wherein said light emission controlling device selects any one of a luminous point displacement mode in which the luminous point is displaced in the backlight area by changing the intensities of the lights emitted from said plurality of light emitting elements or by changing the light emission and non-emission of each of said light emitting elements and an overall light emission mode in which the entire backlight area emits light by substantially equalizing the intensities of the lights emitted from the plurality of light emitting elements.

10. The backlight apparatus according to claim 9, further comprising a first adjusting device for adjusting the intensities of the lights emitted from the plurality of light emitting elements so as to eliminate or reduce a difference between a light amount in the entire backlight area in performing the luminous point displacement mode and a light amount in the entire backlight area in performing the overall light emission mode.

11. The backlight apparatus according to claim 1, further comprising a motion area detecting device for detecting a motion area, which is an area with a motion in the image displayed on the display screen,
   said light emission controlling device displacing the luminous point only in a partial area in the backlight area corresponding to the motion area, or only in a partial area in the backlight area corresponding to a partial area in the display screen including the motion area, on the basis of a detection result by said motion area detecting device.

12. The backlight apparatus according to claim 11, further comprising a second adjusting device for adjusting the intensities of the lights emitted from the plurality of light emitting elements so as to eliminate or reduce a difference between a light amount in the partial area in the backlight area and a light amount in an area other than the partial area in the backlight area.

13. The backlight apparatus according to claim 1, wherein said light emission controlling device synchronizes the displacement of the luminous point with an image display operation of the display panel apparatus.

14. The backlight apparatus according to claim 1, wherein said light emission controlling device controls the displacement of the luminous point such that a luminous point displacement period, which is from a start to an end of the displacement of the luminous point, is shorter than one cycle of an image display period in which one image is displayed on the display screen on the display panel apparatus.

15. A liquid crystal display apparatus comprising: a liquid crystal display panel unit for displaying an image on a display screen by changing optical transmittance of a liquid crystal disposed between two display substrates; and a backlight unit for providing light for said liquid crystal display panel unit, said backlight unit comprising:

a support device;

a plurality of light emitting elements, disposed on said support device, for producing a luminous point in a backlight area which is disposed behind said liquid crystal display panel unit; and a light emission controlling device for displacing the luminous point continuously in a direction of the adjacent light emitting element in the backlight area by changing light emission and non-emission of each of said light emitting elements or by changing intensities of lights emitted from said plurality of light emitting elements.

* * * * *